Patented Feb. 21, 1933

1,898,522

UNITED STATES PATENT OFFICE

WALTER BOCK AND EDUARD TSCHUNKUR, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY

POLYMERIZATION PRODUCT OF BUTADIENE-1.3 HYDROCARBONS AND PROCESS OF MAKING SAME

No Drawing. Application filed January 5, 1931, Serial No. 506,833, and in Germany January 15, 1930.

The present invention relates to a process of polymerizing butadiene-(1.3) hydrocarbons or mixtures thereof with each other or with olefine benzenes in emulsion with water and an agent possessing emulsifying properties, in the presence of chlorinated aliphatic compounds. The invention furthermore relates to the polymerizates obtainable by the process specified above.

The process of manufacture of the invention is by emulsifying the hydrocarbon to be polymerized, such as butadiene-(1.3), isoprene, 1.3-dimethyl-butadiene-(1.3), 2.3-dimethylbutadiene-(1.3), etc. with water and an emulsifying agent or a protein, adding a chlorinated aliphatic compound containing at least two chlorine atoms attached to one and the same carbon atom, and causing polymerization to perform at normal or elevated temperature, for example, at a temperature between about 30–100° C. Shaking or stirring of the emulsion during polymerization will be of advantage. Among the chlorinated aliphatic compounds we prefer those as contain three or more chlorine atoms, of which at least three are attached to one and the same carbon atom, such as for example, hexachloroethane, chloralhydrate, trichloroacetic acid, trichloroacetic acid amide, carbon tetrachloride and the like. Other chlorinated aliphatic compounds of the type specified above, such as asymmetric dichloroethylene, symmetric tetrachloroethylene, dicholoroacetic acid, dichloromalonic acid, higher chlorinated aliphatic aldehydes,-acetals,-alcohols and the like will be likewise operable. Generally, the effect of the chlorinated aliphatic compounds will be the greater, the more chlorine atoms they contain attached to one and the same carbon atom.

By the addition of the aliphatic chlorine compounds in emulsion-polymerization processes the yield of polymerizates is considerably increased and the time of polymerization is shortened. This apparently catalytic effect is in many cases, for example, in case of aliphatic compounds containing three or four chlorine atoms attached to one and the same carbon atom, brought about by even very small quantities of the chlorine compound, for example 0,5–2% by weight (calculated on the amount of hydrocarbon applied). The effect in question is not confined to a definite condition of solubility of the chlorine compound employed in the respective hydrocarbon or in the aqueous phase and is also to a large extent independent of the nature of the emulsifying agent. Thus, for example, a pronounced effect not only takes place in the case of chlorinated compounds of the type specified, which are insoluble in water and miscible with the hydrocarbon to be polymerized (carbon tetrachloride, for example), but also in the case of chlorinated compounds, which are soluble in water and which are soluble with difficulty or insoluble in the said hydrocarbons, (for example, chloral hydrate, the sodium salt of trichloro acetic acid and the like). All the substances indicated are capable in conjunction with the most varied substances exerting an emulsifying action, such as for example, emulsion forming salts of the type of soaps, alkylated naphthalene sulfonic acid salts, salts of sulfonated oils or salts of organic bases with inorganic or organic acids, hydrotropic agents of the most various kind, as far as they exert emulsifying action, albuminous substances, sulfite waste liquor, salts of humic acid, saponins and the like, of increasing quite considerably the yield of polymerizates from the hydrocarbons and of rendering the process substantially quantitative in a comparatively short time.

Either pure butadiene hydrocarbons or mixtures of the same with each other or with olefine benzenes, such as styrol, α-methylstyrol, divinylbenzenes, etc., may be employed as starting materials.

The addition of the aliphatic chlorine compounds in the emulsion-polymerization of butadiene hydrocarbons moreover influences the properties of the polymerization products to a greater or less extent. Thus, the plasticity of the artificial rubber-like masses, obtainable in accordance with the improved emulsion process is in many cases better than that of rubber-like masses produced according to the same process but in the absence of chlorinated aliphatic compounds. Accordingly, while the present process by an appropriate combination of the chlorine compounds and emulsifying agents renders possible the production of plastic rubber-like masses (especially in case of mixed polymerization products), possessing valuable soft rubber properties, there can be obtained, especially when employing highly chlorinated organic compounds, peculiarly altered polymerization products, differing from the hitherto known artificial rubber-like masses. Some of these altered polymerizates are especially suitable for hard rubber purposes, as guttapercha substitutes and for adhesive or solvent purposes and the like.

As mentioned above the chlorinated aliphatic compounds can be applied in rather small amounts (0.5–2% by weight calculated on the hydrocarbon to be polymerized), but in some cases, especially in case that compounds of rather small chlorine content are applied, or in case that it is desired to produce polymerizates of strongly altered properties in comparison to the polymerizates obtainable in the absence of chlorinated aliphatic compounds, it will be of advantage to apply the latter in larger amounts, say up to 10% (calculated on the hydrocarbon applied) or even more.

The aliphatic compounds containing chlorine above indicated can also be used in conjunction with other substances known to be operative in emulsion-polymerization processes, such as for example, electrolytes of various nature, oils and other plasticizing agents.

Accordingly, the process offers a simple means by which in addition to a pronounced increase in the yield of polymerization products and in the speed of the polymerization process the possibility is also provided of regulating to a far-reaching extent the quality of the polymerization products for any desired application.

The following examples illustrate the invention without in any way restricting the same to the proportions given, nor to the particular manner of working.

*Example 1.*—150 kgs. of butadiene and 15 kgs. of hexachloroethane ($Cl_3C-CCl_3$) are emulsified with a solution of 15 kgs. of sodium stearate in 150 kgs. of water and polymerized at ordinary or slightly increased temperature for 5 days. After the addition of acetone a substantially quantitative yield of a polymerization product is obtained, differing in its properties from normal butadiene rubber and which, when rolled out into plates, is transparent in thin layers, has a guttapercha-like appearance and can be kneaded like paraffin wax. Without the use of hexachloroethane the yield under the above conditions of working amounts to only about 45% of rubber and cannot be essentially increased even by prolonging the duration of the polymerization process.

*Example 2.*—150 kgs. of butadiene and 1.5 kgs. of dichloro malonic acid are polymerized in emulsion with a solution of 7 kgs. of saponin in 150 kgs. of water at about 55° C. After 5—6 days a yield of about 80% of a polymerization product is obtained, while without the addition of chlorine compounds the yield under the above conditions of working amounts to only about 45%. When employing trichloroacetic acid instead of the above chlorine compounds the yield is increased to about 90%.

*Example 3.*—100 kgs. of butadiene and 10 kgs. of carbon tetrachloride are polymerized at about 60° C. in emulsion with a solution of 10 kgs. of saponin in 100 kgs. of water. After about 4 days the yield of polymerization product amounts to 75%, while without the presence of carbon tetrachloride scarcely any such rubber formation takes place within the said period.

*Example 4.*—150 kgs. of isoprene and 15 kgs. of carbon tetrachloride are polymerized at about 55° C. in emulsion with a solution of 15 kgs. of casein and 5 grams of acetic acid in 150 kgs. of water for about 14 days. After working up a very plastic rubber is obtained in a yield of about 75%, while without the presence of carbon tetrachloride only 25% of polymerization product is obtained. When carrying out the process in neutral solution the yield is still better.

*Example 5.*—A mixture of 100 kgs. of butadiene and 50 kgs. of styrol with the addition of 10 kgs. of carbon tetrachloride is polymerized with a solution of 15 kgs. of saponin in 150 kgs. of water with agitation at about 60° C. for about 8 days. A plastic polymerization product is obtained in a yield of 100%, which does not possess the valuable soft rubber properties of the styrol-butadiene-emulsion-rubbers, but which is suitable for other technical purposes.

*Example 6.*—A mixture of 50 kgs. of butadiene and 50 kgs. of 2.3-dimethylbutadiene-(1.3) with the addition of 5 kgs. of carbon tetrachloride is polymerized at about 50° C. in emulsion with a solution of 5 kgs. of glue and 5 kgs. of sodium isobutyl-naphthalene-sulfonate in 100 kgs. of water. After about 6 days a 100% yield of a strong, plastic mixed rubber is obtained which possesses the highly valuable properties of soft rubber.

*Example 7.*—A mixture of 100 kgs. of butadiene and 50 kgs. of styrol with the addition of 1 kg. of carbon tetrachloride is polymerized at about 55° C. in emulsion with a solution of 7.5 kgs. of glue and 7.5 kgs. of sodium isobutyl-naphthalene-sulfonate in 150 kgs. of water. After 5 days a 100% yield of a strong, plastic mixed rubber is obtained, which possesses the highly valuable properties of soft rubber, without the presence of carbon tetrachloride only a yield of about 35% of rubber is obtained within the same period and this yield is not essentially increased by prolonging the duration of the polymerization process.

*Example 8.*—A mixture of 100 kgs. of butadiene and 50 kgs. of styrol with the addition of 5 kgs. of chloralhydrate is polymerized in emulsion at about 50–60° C. with a solution of 7.5 kgs. of glue and 7.5 kgs. of sodium isobutyl-naphthalene-sulfonate in 150 kgs. of water for 5 days. A 100% yield of a plastic, mixed rubber is obtained possessing the highly valuable properties of soft rubber. Without the presence of chloralhydrate the yield of styrol-butadiene-emulsion-rubber amounts to only about 30–40% within the same period, which yield is not essentially increased by prolonging the duration of the polymerization process.

*Example 9.*—5 kgs. of sodium trichloroacetate are employed instead of the chloralhydrate in the polymerization mixture given in Example 8 and the polymerization process is carried out under otherwise the same conditions. A quantitative yield of a plastic mixed rubber is obtained after 4 days possessing the highly valuable properties of soft rubber.

When employing sodium acetate free from chlorine instead of the salt containing chlorine, a yield of only about 25–28% is obtained within the same period.

*Example 10.*—1 kg. of trichloroacetic acid is employed instead of the chloralhydrate given in the polymerization mixture in Example 8, and the polymerization process is carried out under otherwise the same conditions. A yield of approximately 75% of a plastic mixed rubber is obtained after only 4 days, which possesses the highly valuable properties of soft rubber. By employing acetic acid free from chlorine instead of the acid containing chlorine the yield is only small within the same period.

We claim:

1. Process which comprises polymerizing a hydrocarbon of the butadiene series in emulsion with water and an agent possessing emulsifying properties, in the presence of a chlorinated aliphatic compound containing at least two chlorine atoms attached to one and the same carbon atom.

2. Process which comprises polymerizing a compound of the probable formula

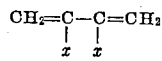

wherein $x$ means hydrogen or methyl, in emulsion with water and an agent possessing emulsifying properties, in the presence of a chlorinated aliphatic compound containing at least two chlorine atoms attached to one and the same carbon atom.

3. Process which comprises polymerizing a mixture of a compound of the probable formula

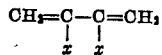

wherein $x$ means hydrogen or methyl, and of an olefine benzene, in emulsion with water and an agent possessing emulsifying properties, in the presence of a chlorinated aliphatic compound containing at least two chlorine atoms attached to one and the same carbon atom.

4. Process which comprises polymerizing a mixture of a compound of the probable formula

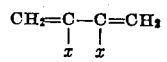

wherein $x$ means hydrogen or methyl, and of styrol, in emulsion with water and an agent possessing emulsifying properties, in the presence of a chlorinated aliphatic compound containing at least two chlorine atoms attached to one and the same carbon atom.

5. Process which comprises polymerizing a hydrocarbon of the butadiene series in emulsion with water and an agent possessing emulsifying properties, in the presence of 0.5–10% by weight (calculated on the amount of hydrocarbon applied) of a chlorinated aliphatic compound containing at least two chlorine atoms attached to one and the same carbon atom.

6. Process which comprises polymerizing a compound of the probable formula

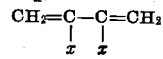

wherein $x$ means hydrogen or methyl, in emulsion with water and an agent possessing emulsifying properties, in the presence of 0.5–10% by weight (calculated on the amount of hydrocarbon applied) of a chlorinated aliphatic compound containing at least two chlorine atoms attached to one and the same carbon atom.

7. Process which comprises polymerizing a mixture of a compound of the probable formula

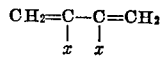

wherein $x$ means hydrogen or methyl, and of an olefine benzene, in emulsion with water and an agent possessing emulsifying properties, in the presence of 0.5–10% by weight (calculated on the mixture of hydrocarbons applied) of a chlorinated aliphatic compound containing at least two chlorine atoms attached to one and the same carbon atom.

8. Process which comprises polymerizing a mixture of a compound of the probable formula

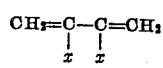

wherein $x$ means hydrogen or methyl, and of styrol, in emulsion with water and an agent possessing emulsifying properties, in the presence of 0.5-10% by weight (calculated on the mixture of hydrocarbons applied) of a chlorinated aliphatic compound containing at least two chlorine atoms attached to one and the same carbon atom.

9. Process which comprises polymerizing a compound of the probable formula

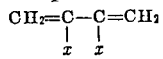

wherein $x$ means hydrogen or methyl, in emulsion with water and an agent possessing emulsifying properties, in the presence of 0.5-10% by weight (calculated on the amount of hydrocarbon applied) of a chlorinated aliphatic compound containing at least three chlorine atoms, of which at least three are attached to one and the same carbon atom.

10. Process which comprises polymerizing a mixture of a compound of the probable formula

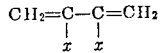

wherein $x$ means hydrogen or methyl, and of an olefine benzene, in emulsion with water and an agent possessing emulsifying properties in the presence of 0.5-10% by weight (calculated on the amount of hydrocarbons applied) of a chlorinated aliphatic compound containing at least three chlorine atoms, of which at least three are attached to one and the same carbon atom.

11. Process which comprises polymerizing a mixture of a compound of the probable formula

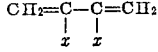

wherein $x$ means hydrogen or methyl, and of styrol, in emulsion with water and an agent possessing emulsifying properties in the presence of 0.5-10% by weight (calculated on the amount of hydrocarbons applied) of a chlorinated aliphatic compound containing at least three chlorine atoms, of which at least three are attached to one and the same carbon atom.

12. Process which comprises polymerizing a compound of the probable formula

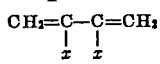

wherein $x$ means hydrogen or methyl, in emulsion with water and an agent possessing emulsifying properties, in the presence of 0.5-10% by weight (calculated on the amount of hydrocarbon applied) of hexachloroethane 13. Process which comprises polymerizing a compound of the probable formula

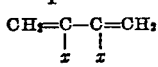

wherein $x$ means hydrogen or methyl, in emulsion with water and an agent possessing emulsifying properties, in the presence of 0.5-10% by weight (calculated on the amount of hydrocarbon applied) of trichloroacetic acid.

14. Process which comprises polymerizing a compound of the probable formula

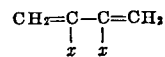

wherein $x$ means hydrogen or methyl, in emulsion with water and an agent possessing emulsifying properties, in the presence of 0.5-10% by weight (calculated on the amount of hydrocarbon applied) of tetrachloromethane.

15. The polymerizates obtainable in accordance with the process claimed in claim 1.

16. The polymerizates obtainable in accordance with the process claimed in claim 3.

17. The polymerizates obtainable in accordance with the process claimed in claim 5.

18. The polymerizates obtainable in accordance with the process claimed in claim 7.

In testimony whereof, we affix our signatures.

WALTER BOCK.
EDUARD TSCHUNKUR.